United States Patent [19]

Boldrini

[11] Patent Number: 5,775,054
[45] Date of Patent: Jul. 7, 1998

[54] UNIT FOR FORMING GROUPS OF CIGARETTES

[75] Inventor: Fulvio Boldrini, Ferrara, Italy

[73] Assignee: G.D. S.p.A., Bologna, Italy

[21] Appl. No.: 802,265

[22] Filed: Feb. 19, 1997

[30] Foreign Application Priority Data

Feb. 19, 1996 [IT] Italy .................. B096 A 000073

[51] Int. Cl.⁶ .................. B65B 19/04; B65B 3/06; A24C 1/38; A24C 1/14
[52] U.S. Cl. .................. 53/149; 53/236; 131/281; 131/282
[58] Field of Search .................. 131/281, 282; 53/149, 151, 236, 247

[56] References Cited

U.S. PATENT DOCUMENTS 4,700,825  10/1987  Mattei et al. .................. 198/419
5,548,941   8/1996  Portaro et al. .................. 153/444

*Primary Examiner*—Vincent Millin
*Assistant Examiner*—Charles W. Anderson
*Attorney, Agent, or Firm*—Cushman Darby & Cushman Intellectual Property Group of Pillsbury Madison & Sutro LLP

[57] ABSTRACT

The unit for forming groups of cigarettes has at least one substantially U-shaped pocket designed to receive in succession at least two layers of cigarettes, in which the cigarettes are parallel with a longitudinal axis of the pocket, the two layers being arranged one above the other to define a respective group; the unit having at least one holding element and, if the group has at least one gap, the unit having at least one dummy positioned parallel with the axis, both being mobile, under the thrust of an actuator, between a home position and an operating position, in which the element and the dummy are positioned respectively outside and inside the pocket, to respectively lock the group of cigarettes within the pocket, and to compensate the gap.

16 Claims, 3 Drawing Sheets

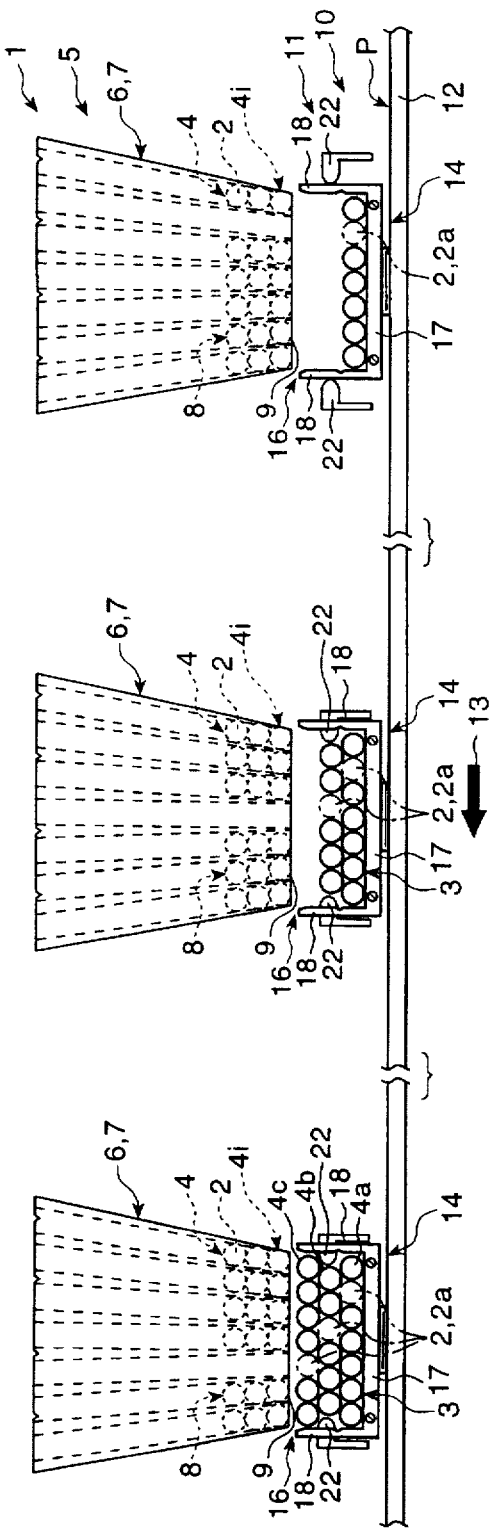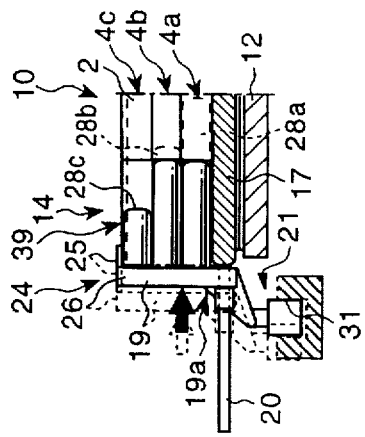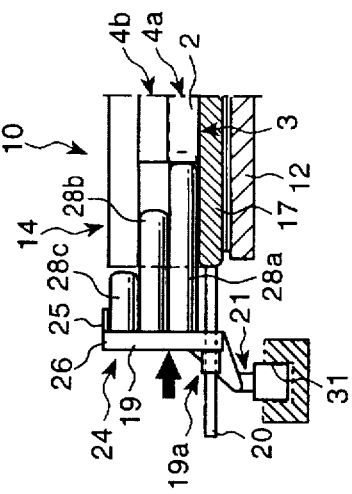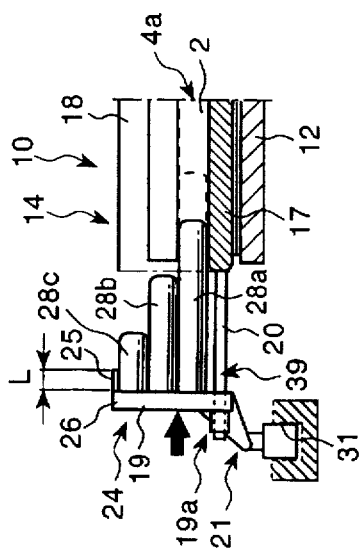

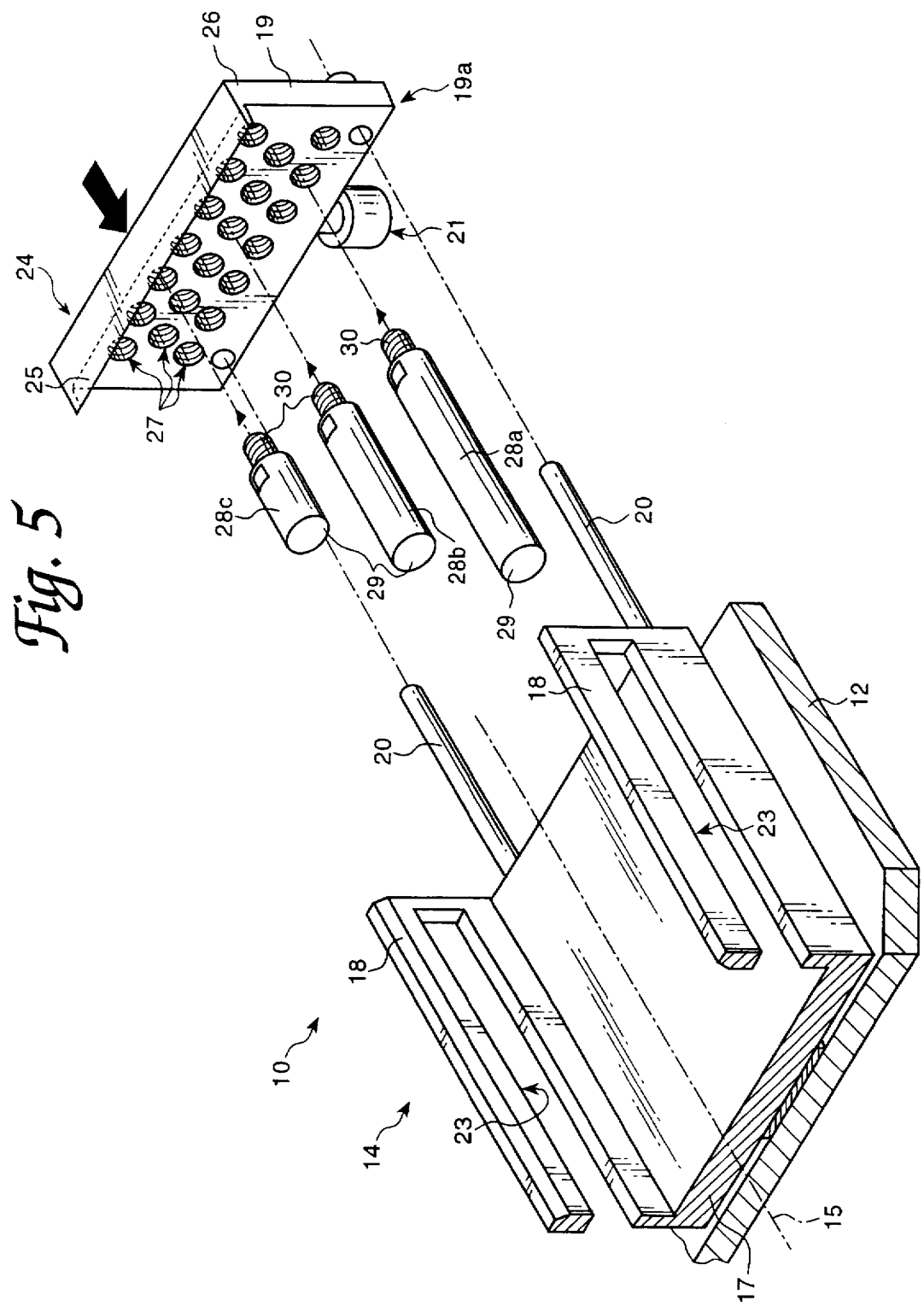

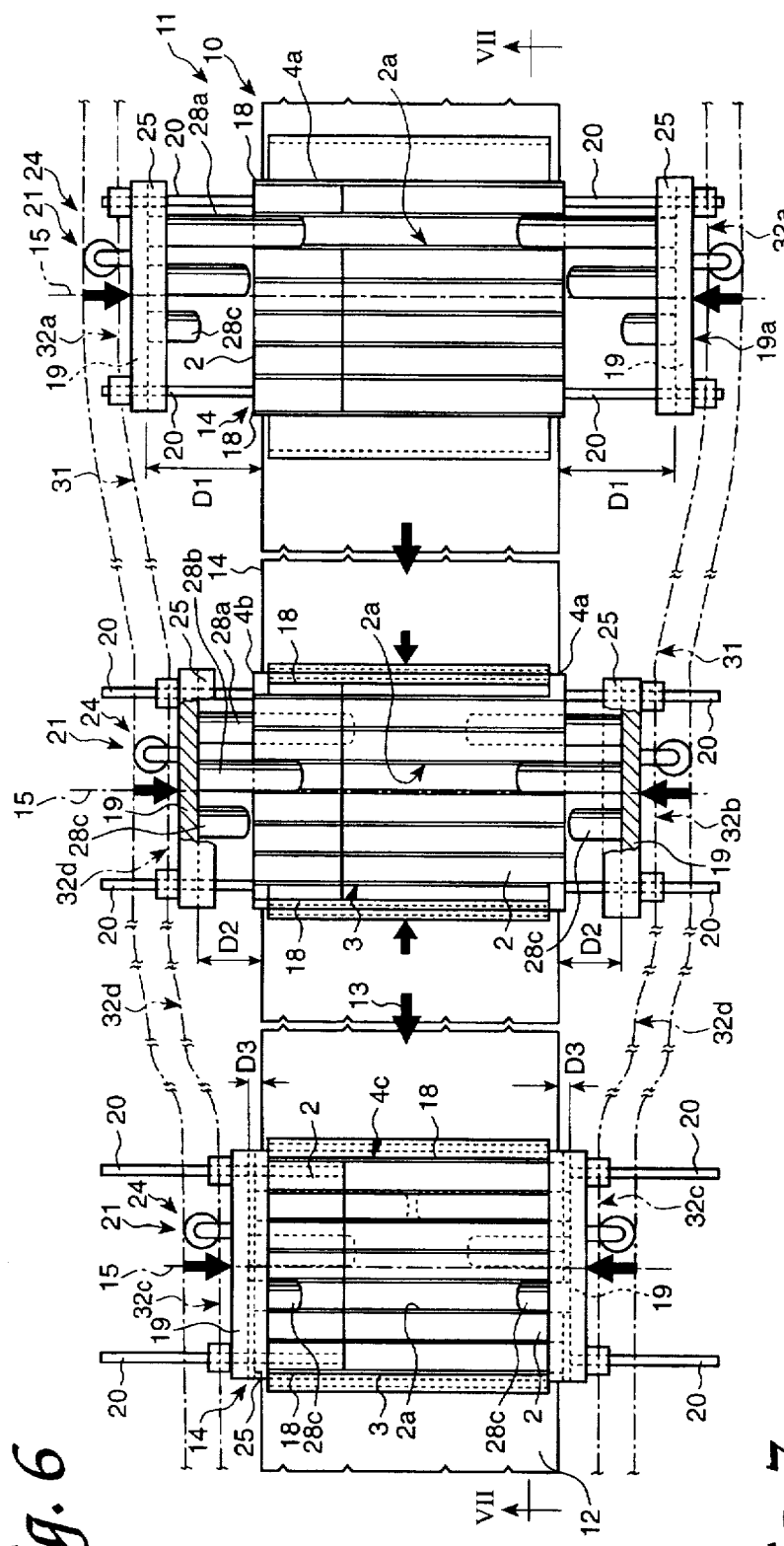
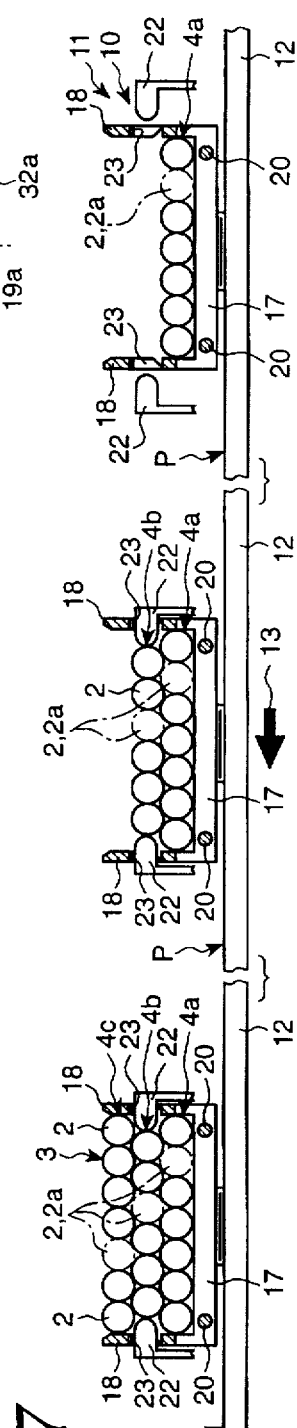
Fig. 6
Fig. 7

5,775,054

UNIT FOR FORMING GROUPS OF CIGARETTES

BACKGROUND OF THE INVENTION

The present invention relates to a unit for forming groups of cigarettes.

In the tobacco industry, groups of cigarettes to be packed on packing machines are currently formed using forming units which include at least one U-shaped pocket designed to receive a respective group, a feed device attached to the pocket, designed to move the latter along a given path, and a feed device positioned along the said path, which feeds at least two layers of cigarettes in succession into the pocket, arranging the layers one above the other, the cigarettes in each layer being parallel with an axis of the pocket.

In particular, the the feed device is designed to feed each layer of cigarettes at respective loading stations positioned along the feed path, downstream of which there are usually respective fixed horizontal elements, which are part of the forming unit, being positioned at different heights immediately after each loading station, and being designed to operate in conjunction with the cigarettes inside each pocket to maintain the layers in contact with one another within the pocket.

However, the presence of the afore-mentioned fixed horizontal elements brings several disadvantages, since, in order to maintain the layers in contact with one another, the fixed elements must apply a slight pressure to the cigarettes of the respective layer, the cigarettes in the layer being damaged by friction.

The object of the present invention is to overcome the afore-mentioned disadvantages by creating a simple, economical unit for forming groups of cigarettes.

SUMMARY OF THE INVENTION

The present invention provides a unit for forming groups of cigarettes which includes at least one substantially U-shaped pocket designed to receive a group, feed means which feed in succession at least a top layer and a bottom layer of cigarettes, one above the other, into the pocket, the cigarettes being parallel with a longitudinal axis of the pocket; the forming unit being characterised in that it includes means for stabilising the cigarettes, said means being attached to the pocket, and an actuator which moves the stabilising means in a direction substantially parallel with the longitudinal axis, between a home position and an operating position, in which the stabilising means are respectively outside and inside the pocket, to maintain the cigarettes within the pocket in the correct position.

In a preferred embodiment of the present invention, in the unit defined above, the stabilising means include two stabilising elements which are located on opposite sides of the pocket and, under the thrust of the actuator, can move in opposite directions between a home position and an operating position, in which they are respectively outside and inside the pocket, keeping the layers in contact with one another within the pocket.

With reference to the known forming units, it should be noticed that it may be necessary to form incomplete groups of cigarettes, that is to say, groups in which the number of cigarettes is lower than the standard number, and in which some cigarettes are absent in one or more of the layers (usually the intermediate layer) of which the group consists.

A group of cigarettes formed in this way is structurally weak and is handled with difficulty by the packing machine, since the cigarettes which form the incomplete layer are held in position exclusively by the cigarettes belonging to the adjacent layers, arranged so that they are staggered relative to the cigarettes in the incomplete layer. Moreover, in an incomplete group formed as described above there are limitations on the number of cigarettes which may be missing in each layer (usually no more than two), the number of incomplete layers which may form an incomplete group (usually only one layer is incomplete), and the positions which the incomplete layers may occupy within the group (the incomplete layer is normally an intermediate layer).

Therefore, a further object of the present invention is to create the above-mentioned forming unit in such a way that it can also form incomplete groups of cigarettes.

For this reason, in the afore-mentioned forming unit, where groups must be formed in which at least one of the layers has at least one gap, the stabilising means usually include at least one dummy positioned parallel with the longitudinal axis and designed to move under the thrust of the actuator, between a home position and an operating position, in which the dummy is respectively outside and inside the pocket, so that it occupies the gap when in the operating position.

In a preferred embodiment of the present invention, in the forming unit defined above, where groups must be formed in which there are at least two gaps, the stabilising means include at least one of the dummies for each gap, the dummies in their home position facing a respective end of the pocket, and the dummies facing the end of the pocket defining a group of integrally linked dummies.

BRIEF DESCRIPTION OF THE DRAWINGS

The present invention is described in detail below, with reference to the accompanying drawings, which illustrate an embodiment by way of example only, and in which:

FIG. 1 is a front elevation, with some parts shown in cross-section and some parts cut away to better illustrate others, of a portion of the infeed of a cigarette packing machine fitted with a unit for forming groups in accordance with the invention disclosed;

FIGS. 2, 3 and 4 are side elevations, with some parts shown in cross-section and some parts cut away to better illustrate others, of a first detail from FIG. 1 in various operating positions;

FIG. 5 is an exploded perspective view, with some parts shown in cross-section and some parts cut away to better illustrate others, of a second detail from FIG. 1;

FIG. 6 is a scaled-up plan of a third detail from FIG. 1; and

FIG. 7 is a cross-section along the line VII—VII in FIG. 6.

DESCRIPTION OF THE PREFERRED EMBODIMENTS

With reference to FIG. 1, the number 1 denotes, as a whole, a packing machine for cigarettes 2, designed to pack groups 3 of cigarettes 2, each including at least one layer 4 (in the embodiment illustrated, there are three layers 4, one above the other), consisting of a given number of cigarettes 2 positioned so that they are coplanar and side-by-side.

The machine 1 includes a unit 5 which feeds layers 4 of cigarettes 2 of the known type, said unit having a hopper 6, the bottom of which has three outlets 7, each designed to internally form a respective series 8 of layers 4 of cigarettes 2. The bottom of each outlet 7 has an opening 9, at which the unit 5 is fitted with a separation and transfer device, of the known type and not illustrated, designed to separate the bottom layer 4, hereinafter denoted 4$i$, from the series 8 and to transfer the layer 4$i$ to a conveyor device 10 for groups 3 of cigarettes 2 which, together with the unit 5, defines a unit 11 for forming the groups 3. In the embodiment illustrated in FIG. 1, all of the layers 4 of each series 8 are usually, but not necessarily, incomplete layers 4, that is to say, layers 4 from which at least one cigarette 2 is missing, forming a gap 2$a$ in the relative layer 4. However, the following description initially refers to complete layers 4 (not illustrated) of cigarettes 2, i.e.: without gaps 2$a$, designed to form complete groups 3.

The device 10 is a pocket conveyor with a belt 12 wrapped around a pair of pulleys which are not illustrated, and which moves in a direction 13 along a given path P. The device 10 has a plurality of pockets 14, whose respective longitudinal axes 15 (FIGS. 5 and 6) are transversal to the direction 13, the pockets being evenly spaced along the belt 12. Each pocket 14 is substantially U-shaped and is designed to receive, at a loading station 16 positioned beneath each outlet 7, a relative layer 4$i$, taken by the separation and transfer device (not illustrated) at the respective opening 9, to form a group 3 of cigarettes 2 to be fed in the direction 13 transversal to the axis of the cigarettes 2.

Each pocket 14 has a horizontal base 17 which is integral with the belt 12, two vertical longitudinal walls 18, parallel with the axis 15, integral with the base 17 and designed to hold the cigarettes 2 in a layer 4 in contact with the base 17, as well as two vertical transversal walls 19, perpendicular to the base 17, walls 18 and axis 15, the walls 19 moving relative to the base 17 and walls 18 on guides 20 which are parallel with the axis 15 and integral with the pocket 14, under the thrust of a cam device 21. The walls 19 constitute slides 19$a$ which move upon the respective guides 20.

In the embodiment illustrated, each group 3 includes three stacked layers, the bottom layer 4$a$ being in contact with the base 17, the middle layer 4$b$ adjacent to layer 4$a$, and the top layer 4$c$ adjacent to layer 4$b$ and on the opposite side of layer 4$b$. The cigarettes 2 in layer 4$b$ are arranged so that they are staggered relative to the cigarettes 2 in the adjacent layers 4, and cannot completely occupy the space available between the two walls 18.

As is more clearly illustrated in FIG. 7, in order to keep the cigarettes 2 in layer 4$b$ in a fixed position within the pocket 14, each wall 18 has a pair of transversal restraining elements 22 which move through relative openings 23 in the walls 18 so as to hold the layer 4$b$ in position. An actuator (of a known type, not illustrated) controls the movement of the elements 22 within the pocket 14 in order to occupy the free space between each wall 18 and the cigarettes 2 in layer 4$b$ immediately after formation of the layer 4$b$ in the pocket 14, and to hold the cigarettes 2 in layer 4$b$ in position relative to the cigarettes 2 in layer 4$a$. As shown in FIG. 5, the unit 11 includes a stabilising device 24 which includes not only the walls 19 and device 21, but also two stabilising elements 25, consisting of plates which extend from the walls 19 towards the pocket 14, protruding from the respective walls 19 by a given length L, being coplanar to one another and transversal to the axis 15. In particular, the elements 25 can move, together with the respective walls 19 and driven by the action of the device 21, between a home position (FIG. 2) in which the elements 25 are outside the pocket 14, and an operating position (FIG. 4) in which the elements 25 are inside the pocket 14 to hold the layers 4 in contact with one another within the pocket 14, stabilising the positions of the cigarettes 2 in each layer 4.

It should be noticed that, according to an embodiment of the present invention which is not illustrated, the actuator 21 could, in a known way, be configured so that it transmits a substantially, yet not perfectly straight motion to the walls 19. For example, the motion of the walls 19 as they approach the pocket 14 could be partly parallel with the axis 15 and partly directly towards the base 17 of the pocket 14, to allow the elements 25 to approach the cigarettes 2 which form the groups 3 housed in the pocket 14 from above; moreover, as the walls 19 travel away from the pocket 14, the motion of the walls 19 may be parallel with the axis 15.

In the embodiment illustrated in FIGS. 2, 3 and 4, the elements 25 are located at the free top ends 26 of the respective walls 19, and are designed, when in the said operating position, to operate in conjunction with the cigarettes 2 in layer 4$c$.

In an embodiment which is not illustrated, the device 24 includes two further stabilising elements, supported by the walls 19, positioned beneath the elements 25 and protruding from the walls 19 towards the pocket 14 by a given length which is greater than the length L of the elements 25, so that, when inside the pocket 14 in an intermediate operating position between the home position and operating position of the elements 25, they operate in conjunction with the cigarettes 2 in layer 4$b$, holding the cigarettes 2 in a given stable position relative to the cigarettes 2 in layer 4$a$ as the pocket 14 moves from the station 16 which feeds layer 4$b$ to the next station 16.

In the embodiment illustrated in the accompanying drawings, in which, as already described, the groups 3 of cigarettes 2 are incomplete groups 3, having at least one gap 2$a$, beneath the elements 25, each wall 19 has a plurality of threaded holes 27, each with a diameter smaller than that of the cigarettes 2, and aligned with a respective cigarette 2 when the pocket 14 is occupied by a complete group 3 of cigarettes 2. The two walls 19 also have a plurality of dummies 28 with circular cross-section, each having a first end portion 29 whose diameter is equal to that of the cigarettes 2, and a threaded end shank 30 whose diameter is equal to that of the holes 27. When fitted on the wall 19, each dummy 28 extends transversal to the wall 19 itself towards the relative pocket 14, parallel with the axis 15.

In the embodiment of the present invention illustrated, the dummies 28 are substantially cylindrical, although they could have a different shape, since they may taper from the threaded shank 30 to the end portion 29.

The distribution of the dummies 28 on one of the two walls 19 mirrors the distribution of the dummies 28 on the opposite wall 19; therefore, each dummy 28 fitted on one of the two walls 19 is coaxial to a corresponding dummy 28 fitted on the opposite wall 19. Two dummies 28, fitted so that they are coaxial to one another on the respective walls 19 are designed to occupy a gap 2$a$ within the pocket 14; therefore, if a group 3 has incomplete layers 4, the dummies 28 are arranged on the walls 19 in such a way that they compensate, i.e.: fill, all of the gaps 2$a$ and keep the incomplete layers 4 compact during formation of the group 3.

In particular, with reference to FIGS. 2, 3 and 4, the length of the dummies 28 differs depending on the position of the gaps 2$a$ within the pocket 14. If the dummies 28 must occupy a gap 2$a$ in layer 4$a$, both dummies 28, in this case denoted by 28$a$, have a length L1 greater than the length L2 of the dummies 28, hereinafter denoted by 28$b$, which must occupy gaps 2$a$ in layer 4$b$, and the length L2 is greater than the length L3 of the dummies 28, hereinafter denoted by 28$c$, which must occupy the gaps 2$a$ in layer 4$c$. Moreover, the length L3 of dummies 28c is greater than the length L of the elements 25 since, when both the dummies 28c and the elements 25 are used in the respective operating positions, the elements 25 must only operate in conjunction with respective end portions of the cigarettes 2 in layer 4c.

FIG. 6 illustrates the cam device 21 which includes, for each wall 19, a race 31 which extends at the side of the belt 12 in front of the stations 16 and includes a given number of segments 32 parallel with the direction 13 and positioned at a given distance from the edges of the belt 12.

In the embodiment illustrated, each race 31 has three consecutive segments 32a, 32b, 32c, the first being designed to set the walls 19 at a distance D1 from the respective end of the pocket 14, so as to hold only dummies 28a inside the pocket 14, with the dummies 28b just outside the pocket 14; the second segment is closer to the belt 12 than segment 32a by a distance which is approximately, by default, the difference between L2 and L3, and is designed to set the walls 19 at a distance D2<D1 from the respective end of the pocket 14, so as to hold dummies 28a and 28b inside the pocket 14 and the dummies 28c just outside the pocket 14; the third segment being closer to the belt 12 than segment 32b, and being designed to set the walls 19 adjacent to the respective end of the pocket 14, so as to guarantee that all of the dummies 28 are inside the pocket 14, and that the elements 25 are substantially in contact with the opposite ends of the cigarettes 2 in layer 4c.

Moreover, each race 31 includes a further segment 32d, in an intermediate position between segments 32b and 32c along the path P and closer to the belt 12 than segment 32b by a distance which is approximately, by default, the difference between L and L1, being designed to set the walls 19 at a distance D2<D3<D1 from the respective end of the pocket 14, so as to hold the dummies 28a and 28b inside the pocket 14, dummies 28c substantially inside the pocket 14, and the elements 25 just outside the pocket 14.

The operation of the unit 11 is described below with reference to a single pocket 14, assuming that a single group 3 with three incomplete layers 4, one above the other, is formed, since from this explanation it is easy to understand the operation of the unit 11 when forming complete groups 3, where the dummies 28 are absent.

When the machine 1 is running, the belt 12 moves the pockets 14 in the direction 13, along path P, at a substantially constant speed. When the pocket 14, containing no cigarettes 2, approaches the first loading station 16 along segment 32a, the cam device 21 sets the walls 19 at the distance D1 (FIGS. 6a and 7a) from the pocket 14, so that only the dummies 28a are positioned inside the pocket 14, occupying the gaps 2a in layer 4a. At the loading station 16, the separation and transfer device (not illustrated) relative to the first outlet 7 takes layer 4i from the outlet 7 and transfers it into the pocket 14 to form layer 4a.

Then the pocket 14 moves away from the station 16 and approaches the next station 16 along segment 32b. During its passage from the first station 16 to the second, the cam device 21 moves the walls 19 to distance D2 from the respective pocket 14, so that dummies 28b are also positioned inside the pocket 14, occupying the gaps 2a in layer 4b (FIGS. 6b and 7b). At the loading station 16, the separation and transfer device (not illustrated) relative to the second outlet 7 takes layer 4i from the outlet 7 and transfers it into the pocket 14 to form layer 4b.

When layer 4b has been formed, the elements 22 are inserted in the pocket 14, to hold layer 4b in position. The pocket 14 then moves away from the station 16 and, before arriving at the final station 16 along the segment 32c, the cam device 21 sets the walls 19 at distance D3 (FIG. 4 dashed line) from the relative pocket 14, so that dummies 28c are also partially inside the pocket 14, occupying the gaps 2a in layer 4c. At the loading station 16, the separation and transfer device (not illustrated) relative to the third outlet 7 takes layer 4i from the outlet 7 and transfers it into the pocket 14 to form layer 4c. When layer 4c has been formed, the device 21 sets the walls 19 in contact with the relative pocket 14 (FIG. 6c), to position the elements 25 inside the pocket 14 and substantially in contact with the opposite ends of the cigarettes 2 in layer 4c. Upon completion of the formation of the group 3, the pocket 14 continues along the path P.

In an embodiment which is not illustrated, at least one of the walls 19 is fitted in a fixed position, in contact with the base 17 and walls 18 of the pocket 14, and has a plurality of holes, which may or may not be threaded and have a diameter substantially equal to that of the cigarettes 2. A dummy 28 moves through each hole, the dummies being moved selectively by a linear actuator, between a first position in which the dummy 28 extends inside the respective pocket 14, occupying a corresponding gap 2a, and a second position in which the dummy 28 occupies the corresponding hole without extending into the pocket 14.

It should be noticed that, according to embodiments of the present invention which are not illustrated, the elements 25 could be absent, and the groups 3 of cigarettes 2 could be held in the correct position within the pocket 14 by any known type of device made for that purpose.

What is claimed is:

1. A unit for forming groups of cigarettes including:
at least one substantially U-shaped pocket designed to receive a group, feed means to feed in succession at least a bottom layer and a top layer of cigarettes, one above the other, into the pocket, the cigarettes being parallel with a longitudinal axis of the pocket; means for stabilising the cigarettes, said means being attached to the pocket, and an actuator for moving the stabilising means in a direction substantially parallel with said longitudinal axis, between a home position and an operating position, in which the stabilising means are respectively outside and inside the pocket, so as to hold the cigarettes in the correct position within the pocket.

2. The unit as described in claim 1, wherein: the stabilising means include two stabilising elements, said elements being positioned on opposite sides of the pocket and being moved in opposite directions by the actuator, between a home position and an operating position, in which the elements are respectively outside and inside the pocket, so as to hold the layers in contact with one another within the pocket.

3. The unit as described in claim 2, wherein: on opposite sides of the pocket, the stabilising means include respective support slides, said slides being moved in a direction substantially parallel with the longitudinal axis by the actuator, and facing a respective side of the pocket.

4. The unit as described in claim 3, wherein: the stabilising elements protrude from the slide towards the pocket.

5. The unit as described in claim 3, wherein: each slide includes a wall, said wall being positioned transversal to the longitudinal axis; each stabilising means consisting of a plate supported by the respective wall at a free top end of the wall itself; the actuator being designed to move the stabilising means and walls in a substantially axial direction towards the respective operating positions.

6. The unit as described in claim 1 for the formation of groups in which at least one of the layers has at least one gap, wherein: the stabilising means include at least one dummy, said dummy being positioned parallel with the longitudinal axis and being moved by the actuator between a home position and an operating position, in which the dummy is respectively outside and inside the pocket, so that in the operating position it occupies the gap.

7. The unit as described in claim 6 for the formation of groups which have at least two gaps, wherein:
the stabilising means include at least one dummy for each gap, the dummies, when in their home position, facing a respective end of the pocket, thus defining an integral group of dummies.

8. The unit as described in claim 7 for the formation of groups in which each layer has at least one gap, wherein: each dummy relative to a gap in the lower layer protrudes axially by a given length with respect to each dummy belonging to the same group of dummies and relative to a gap in the upper layer.

9. The unit as described in claim 7, wherein: for each of the groups of dummies, the stabilising means include a support slide, said slide being moved by the actuator in a direction substantially parallel with the longitudinal axis and being positioned facing a respective side of the pocket; the dummies in the said group of dummies protruding from the slide towards the pocket.

10. The unit as described in claim 9, wherein: each slide has a plurality of coupling means, each of the coupling means being aligned with a position to be occupied, when in operation, by a cigarette which is part of the group of cigarettes inside the pocket; each dummy is coupled in such a way that it cannot be removed, to the respective slide by the coupling means.

11. The unit as described in claim 10, wherein: at the end opposite that facing the pocket each dummy has a threaded shank; each slide including a wall, the wall being positioned transversal to the longitudinal axis, and each coupling means including a threaded hole made through the wall and designed to house a shank.

12. The unit as described in claim 11, wherein: the stabilising means include stabilising elements, each consisting of a plate supported by a respective slide at a free top end of the slide; the plates protruding from the slide on the same side as the respective group of dummies; the actuator being designed to move the dummies in the same group of dummies, together with the respective plates, in a substantially axial direction towards the respective operating positions.

13. The unit as described in claim 6, wherein: for each gap, there are two dummies, said dummies being positioned coaxial to one another and on opposite sides of the pocket, and moving between the said home and operating positions.

14. The unit as described in claim 6, wherein: starting from the end portions opposite to those facing the pocket, the dummies are tapered.

15. The unit as described in claim 1, wherein: the actuator is made so that it moves the stabilising means, at least as they approach the pocket, in a direction which is in part parallel with the longitudinal axis and in part directly towards the base of the pocket.

16. The unit as described in claim 15, wherein: the actuator is made so that it moves the stabilising means, as they move away from the pocket, along a straight trajectory which is parallel with the axis.

* * * * *